(12) United States Patent
Komada (10) Patent No.: US 10,384,741 B2
(45) Date of Patent: Aug. 20, 2019

(54) BICYCLE HYDRAULIC OPERATING DEVICE

(71) Applicant: Shimano Inc., Sakai, Osaka (JP)

(72) Inventor: Yasuyuki Komada, Osaka (JP)

(73) Assignee: Shimano Inc., Osaka (JP)

( * ) Notice: Subject to any disclaimer, the term of this patent is extended or adjusted under 35 U.S.C. 154(b) by 50 days.

(21) Appl. No.: 15/282,400

(22) Filed: Sep. 30, 2016

(65) Prior Publication Data

US 2018/0093737 A1 Apr. 5, 2018

(51) Int. Cl.
*B62L 3/02* (2006.01)
*B62K 23/06* (2006.01)
*B60T 11/22* (2006.01)
*B60T 7/08* (2006.01)
*B62M 25/08* (2006.01)

(52) U.S. Cl.
CPC .............. *B62L 3/023* (2013.01); *B62K 23/06* (2013.01); *B62M 25/08* (2013.01)

(58) Field of Classification Search
CPC ......... B62K 3/023; B62K 23/06; B62L 3/023; B60T 11/22; B60T 7/08
See application file for complete search history.

(56) References Cited

U.S. PATENT DOCUMENTS

| | | | | |
|---|---|---|---|---|
| 2,271,273 A | * | 1/1942 | Mueller | B62L 3/023 188/24.11 |
| 3,802,200 A | * | 4/1974 | Kolm | B62L 3/023 60/588 |
| 4,407,125 A | * | 10/1983 | Parsons | B60T 11/16 60/584 |
| 5,636,518 A | * | 6/1997 | Burgoyne | B62K 23/02 60/594 |
| 6,003,639 A | * | 12/1999 | Buckley | B62K 23/06 188/26 |
| 6,484,855 B1 | * | 11/2002 | Yaple | B62L 3/023 180/219 |
| 6,922,994 B1 | * | 8/2005 | Lavezzi | B60T 11/16 60/588 |
| 7,497,309 B2 | * | 3/2009 | Chen | B62L 3/023 188/24.22 |
| 7,540,147 B2 | | 6/2009 | Takizawa et al. | |
| 7,578,375 B2 | * | 8/2009 | Lin | B60T 7/10 188/344 |
| 9,365,260 B2 | * | 6/2016 | Nago | B62L 3/023 |
| 2007/0175290 A1 | * | 8/2007 | Fujii | B62K 23/02 74/502.2 |

(Continued)

*Primary Examiner* — Thomas J Williams
*Assistant Examiner* — James K Hsiao
(74) *Attorney, Agent, or Firm* — Global IP Counselors, LLP (57) ABSTRACT

A bicycle hydraulic operating device is basically provided with a first base part, a second base part and a piston. The first base part includes a cylinder bore, a first end surface having a first opening, and a first passage extending from the first opening in the first end surface to the cylinder bore. The second base part includes a reservoir tank, a second end surface having a second opening, and a second passage extending from the second opening in the second end surface to the reservoir tank. The first end surface faces the second end surface. The first and second passages are fluidly connected via the first and second openings. The piston is movably disposed in the cylinder bore of the first base part.

22 Claims, 10 Drawing Sheets

(56) References Cited

U.S. PATENT DOCUMENTS

| | | | |
|---|---|---|---|
| 2008/0155982 A1* | 7/2008 | Jones | B60T 11/22 60/588 |
| 2008/0251334 A1 | 10/2008 | Takizawa et al. | |
| 2009/0114057 A1* | 5/2009 | Fukui | B62K 23/06 74/551.8 |
| 2009/0120750 A1* | 5/2009 | Chen | B60T 7/10 188/344 |
| 2009/0188340 A1* | 7/2009 | Tetsuka | B62K 23/02 74/473.13 |
| 2009/0235772 A1* | 9/2009 | Naka | B62M 25/08 74/502.2 |
| 2010/0000368 A1* | 1/2010 | Poertner | B62K 21/125 74/551.1 |
| 2010/0052415 A1* | 3/2010 | Vezzoli | B60T 11/22 303/10 |
| 2010/0064838 A1* | 3/2010 | Siew | B60T 11/22 74/491 |
| 2010/0083786 A1* | 4/2010 | Miki | B62K 21/26 74/489 |
| 2010/0186538 A1* | 7/2010 | Tetsuka | B60T 7/102 74/501.6 |
| 2010/0218636 A1* | 9/2010 | Wen | B60T 7/102 74/491 |
| 2011/0031079 A1* | 2/2011 | Matsushita | B60T 7/102 188/344 |
| 2011/0048161 A1* | 3/2011 | Shipman | F16C 1/16 74/502.2 |
| 2012/0160625 A1* | 6/2012 | Jordan | B60T 7/102 188/344 |
| 2012/0222416 A1 | 9/2012 | Hirose et al. | |
| 2013/0180815 A1* | 7/2013 | Dunlap | B62L 3/023 188/344 |
| 2013/0255239 A1* | 10/2013 | Miki | B62L 3/023 60/325 |
| 2013/0333994 A1* | 12/2013 | Jordan | B62L 3/02 188/344 |
| 2014/0015659 A1* | 1/2014 | Tetsuka | B62K 23/02 340/432 |
| 2014/0034428 A1* | 2/2014 | Kariyama | B62L 3/023 188/72.4 |
| 2014/0144275 A1* | 5/2014 | Kariyama | B62L 3/023 74/488 |
| 2015/0291247 A1* | 10/2015 | Fukao | B62L 3/023 74/473.14 |
| 2015/0367908 A1* | 12/2015 | Kariyama | B62K 23/06 188/72.4 |
| 2016/0311500 A1* | 10/2016 | Kasai | B62M 6/45 |

* cited by examiner

BICYCLE HYDRAULIC OPERATING DEVICE

BACKGROUND

Field of the Invention

This invention generally relates to a bicycle hydraulic operating device. More specifically, the present invention relates to a bicycle hydraulic operating device for operating a hydraulic bicycle component.

Background Information

In recent years, some high performance bicycles have been provided with hydraulic disc brake systems or other brake types of hydraulic brake system such as hydraulic shoe brakes. In the case of bicycles, the hydraulic brake systems are typically actuated by a brake lever that is attached to a bicycle handlebar. The brake lever is typically part of a brake operating device that attaches the brake lever to the bicycle handlebar. The brake operating device typically includes a master piston that is slidably disposed in a cylinder bore of a master cylinder, and which is actuated by the brake lever. In the bicycle market, there is demand to improve such the brake operating device in aspects of size, weight, appearance and so on.

SUMMARY

Generally, the present disclosure is directed to various features of a bicycle hydraulic operating device.

In view of the state of the known technology and in accordance with a first aspect of the present disclosure, a bicycle hydraulic operating device is basically provided that comprises a first base part, a second base part and a piston. The first base part includes a cylinder bore, a first end surface having a first opening, and a first passage extending from the first opening in the first end surface to the cylinder bore. The second base part includes a reservoir tank, a second end surface having a second opening, and a second passage extending from the second opening in the second end surface to the reservoir tank. The first end surface faces the second end surface. The first and second passages are fluidly connected via the first and second openings. The piston is movably disposed in the cylinder bore of the first base part. According to the first aspect of the present invention, the bicycle hydraulic operating device can be relatively easy to manufacture.

In accordance with a second aspect of the present invention, the bicycle hydraulic operating device according to the first aspect is configured so that the first base part is constructed of a first material, and the second base part is constructed of a second material that is different from the first material. According to the second aspect of the present invention, the bicycle hydraulic operating device can be made lighter in weight.

In accordance with a third aspect of the present invention, the bicycle hydraulic operating device according to the second aspect is configured so that the first material of the first base part is a metallic material. According to the third aspect of the present invention, the bicycle hydraulic operating device can be provided with a strong and durable structure that is connected to the handlebar.

In accordance with a fourth aspect of the present invention, the bicycle hydraulic operating device according to the second or third aspect is configured so that the second material of the second base part is a resin material. According to the fourth aspect of the present invention, the bicycle hydraulic operating device can be made lighter in weight.

In accordance with a fifth aspect of the present invention, the bicycle hydraulic operating device according to any one of the first to fourth aspects further comprises a handlebar fixing structure provided on the first base part. According to the fifth aspect of the present invention, the bicycle hydraulic operating device can be attached to a handlebar.

In accordance with a sixth aspect of the present invention, the bicycle hydraulic operating device according to the fifth aspect is configured so that the handlebar fixing structure is configured to be disposed inside a handlebar. According to the sixth aspect of the present invention, the bicycle hydraulic operating device can be aerodynamically attached to a bicycle.

In accordance with a seventh aspect of the present invention, the bicycle hydraulic operating device according to any one of the first to sixth aspects further comprises an operating member movably mounted on the second base part and operatively coupled to the piston to move the piston. According to the seventh aspect of the present invention, the bicycle hydraulic operating device can be reliably operated by a rider.

In accordance with an eighth aspect of the present invention, the bicycle hydraulic operating device according to the seventh aspect is configured so that the operating member is pivotally mounted to the second base part about a pivot axis. According to the eighth aspect of the present invention, the bicycle hydraulic operating device can be easily operated by a rider gripping a handlebar.

In accordance with a ninth aspect of the present invention, the bicycle hydraulic operating device according to the seventh or eighth aspect further comprises a first position adjustment structure configured to adjust a rest position of the operating member with respect to the second base part. According to the ninth aspect of the present invention, the bicycle hydraulic operating device can be adjusted to accommodate different riders' hand sizes.

In accordance with a tenth aspect of the present invention, the bicycle hydraulic operating device according to the ninth aspect is configured so that the first position adjustment structure includes a rotating shaft adjustably connecting the operating member to the piston to adjust the rest position of the operating member with respect to the second base part. According to the tenth aspect of the present invention, the rest position of the operating member can be easily adjusted with respect to the base member.

In accordance with an eleventh aspect of the present invention, the bicycle hydraulic operating device according to any one of the first to tenth aspects further comprises a second position adjustment structure configured to adjust a rest position of the piston in the cylinder bore. According to the eleventh aspect of the present invention, the bicycle hydraulic operating device can be adjusted to accommodate different preferences of riders.

In accordance with a twelfth aspect of the present invention, the bicycle hydraulic operating device according to the eleventh aspect is configured so that the second position adjustment structure includes a seat provided on the second base part to receive the piston, and an adjustment screw screwed into the second base part to move the seat. According to the twelfth aspect of the present invention, the rest position of the piston can be easily adjusted.

In accordance with a thirteenth aspect of the present invention, the bicycle hydraulic operating device according to the twelfth aspect is configured so that the adjustment screw is provided on the second base part. According to the thirteenth aspect of the present invention, the adjustment screw can be easily accessed.

In accordance with a fourteenth aspect of the present invention, the bicycle hydraulic operating device according to any one of the first to thirteenth aspects is configured so that the first passage includes a first portion extending parallel to a cylinder axis of the cylinder bore from the first opening in the first end surface. According to the fourteenth aspect of the present invention, the bicycle hydraulic operating device can be relatively compact in size.

In accordance with a fifteenth aspect of the present invention, the bicycle hydraulic operating device according to the fourteenth aspect is configured so that the first passage includes a second portion extending non-parallel to fluidly connecting the first portion to the cylinder bore. According to the fifteenth aspect of the present invention, the bicycle hydraulic operating device can be relatively easy to manufacture.

In accordance with a sixteenth aspect of the present invention, the bicycle hydraulic operating device according to any one of the first to fifteenth aspects is configured so that the second base part includes a bleed port fluidly connected to the reservoir tank. According to the sixteenth aspect of the present invention, the bicycle hydraulic operating device is configured such that a bleeding process becomes easy to carry out.

In accordance with a seventeenth aspect of the present invention, the bicycle hydraulic operating device according to any one of the first to sixteenth aspects is configured so that the first base part further includes a handlebar abutment that is configured to contact an end of a handlebar. According to the seventeenth aspect of the present invention, the bicycle hydraulic operating device can be securely mounted to the handlebar.

In accordance with an eighteenth aspect of the present invention, the bicycle hydraulic operating device according to any one of the first to seventeenth aspects further comprises an operating unit disposed on at least one of the first base part and the second base part. According to the eighteenth aspect of the present invention, the bicycle hydraulic operating device can operate another bicycle component.

In accordance with a nineteenth aspect of the present invention, the bicycle hydraulic operating device according to the eighteenth aspect is configured so that the operating unit includes an electric switch. According to the nineteenth aspect of the present invention, the bicycle hydraulic operating device can be more simple to assembly than a mechanical cable pulling and releasing unit.

In accordance with a twentieth aspect of the present invention, the bicycle hydraulic operating device according to the nineteenth aspect is configured so that the operating unit further includes a user interface member configured to operate the electric switch. The electric switch is arranged between the reservoir tank and the user interface member. According to the twentieth aspect of the present invention, the bicycle hydraulic operating device can be relatively compact in size.

In accordance with a twenty-first aspect of the present invention, the bicycle hydraulic operating device according to the nineteenth or twentieth aspect further comprises a wireless communication unit electrically coupled to the electric switch of the operating unit. According to the twenty-first aspect of the present invention, the bicycle hydraulic operating device can provide a more attractive appearance for the bicycle by eliminating electrical wires.

In accordance with a twenty-second aspect of the present invention, the bicycle hydraulic operating device according to any one of the first to twenty-first aspects is configured so that the second base part is provided as a separate member with respect to the first base part. According to the twenty-second aspect of the present invention, the bicycle hydraulic operating device can be relatively easy to manufacture.

In accordance with a twenty-third aspect of the present invention, the bicycle hydraulic operating device according to the twenty-second aspect is configured so that the second base part is detachably coupled to the first base part. According to the twenty-third aspect of the present invention, the bicycle hydraulic operating device can be relatively easy to service.

In accordance with a twenty-fourth aspect of the present invention, the bicycle hydraulic operating device according to the twenty-second or twenty-third aspect is configured so that the second base part is directly in contact with the first base part. According to the twenty-fourth aspect of the present invention, the bicycle hydraulic operating device can be relatively compact in size.

Also other objects, features, aspects and advantages of the disclosed bicycle hydraulic operating device will become apparent to those skilled in the art from the following detailed description, which, taken in conjunction with the annexed drawings, discloses embodiments of the bicycle hydraulic operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
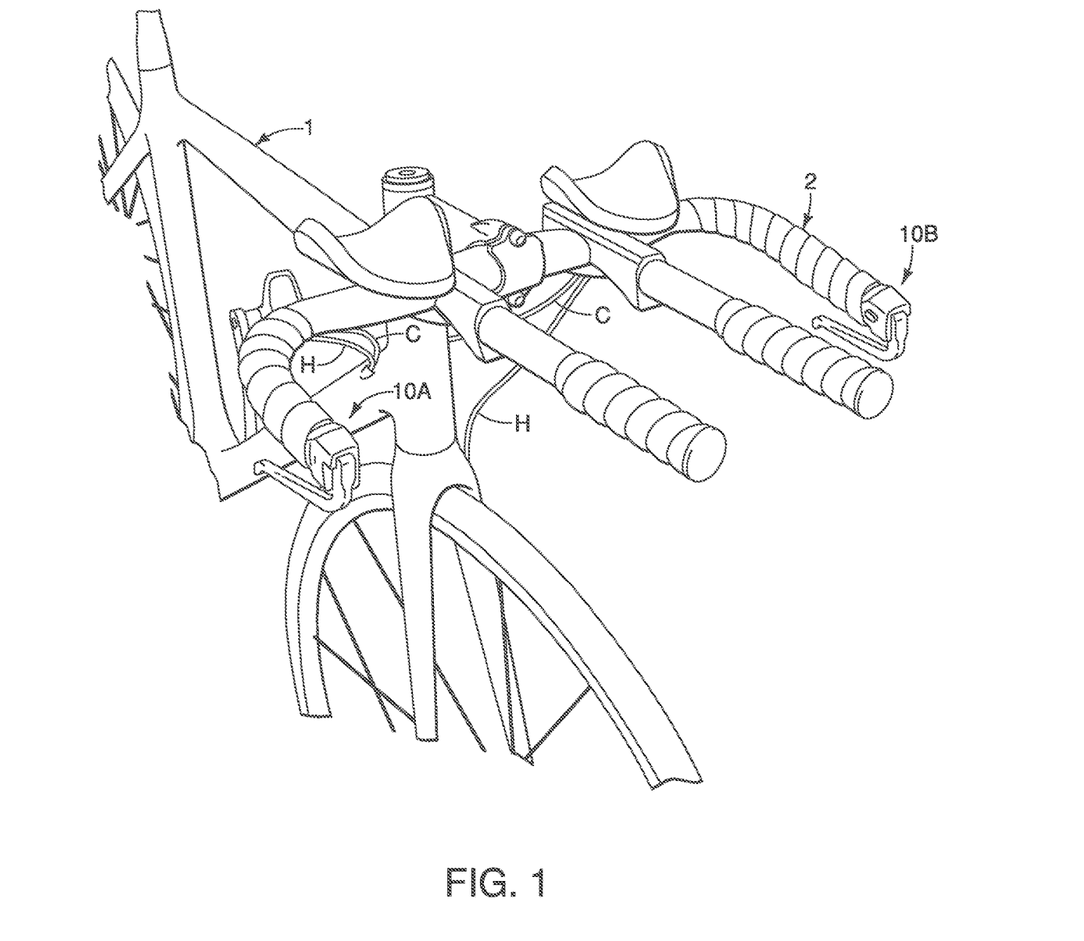
FIG. 1 is a top perspective view of a right end of a bicycle handlebar that is equipped with a bicycle hydraulic operating device in accordance with one illustrated embodiment.

Referring initially to FIG. 1, a portion of a bicycle 1 is illustrated having a handlebar 2 with a pair of bicycle hydraulic operating devices 10A and 10B in accordance with a first embodiment. The bar-end type bicycle hydraulic operating devices 10A and 10B are configured to be mounted to opposite ends of the handlebar 2 which is a time trial or bull horn handlebar, respectively. The bicycle hydraulic operating devices 10A and 10B are configured to be mounted to a free end of the handlebar 2 and protrude outwardly in an axial direction from the free end of the handlebar 2.

Basically, as seen in FIG. 1, the bicycle hydraulic operating device 10A is a right hand side operating device that is operated by the rider's right hand to actuate a first hydraulic brake device (not shown) and a first electric shifting device (not shown). The bicycle hydraulic operating device 10B is a left hand side operating device that is operated by the rider's left hand to actuate a second hydraulic brake device (not shown) and a second electric shifting device (not shown). The first and second electric shifting devices are part of a conventional bicycle driving system that is used to shift a bicycle chain for changing speed stages or gear stages of the drive train in a relatively conventional manner. The bicycle hydraulic operating device 10A is operatively coupled to the first hydraulic brake device (not shown) via a hydraulic hose H, and to the first electric shifting device (not shown) via an electrical cable C. The bicycle hydraulic operating device 10B is operatively coupled to the second hydraulic brake device (not shown) via a hydraulic hose H, and to the second electric shifting device (not shown) via an electrical cable C. Alternatively, the bicycle hydraulic operating devices 10A and 10B can be used to control other hydraulic devices and/or other electric components of the bicycle 1.

The bicycle hydraulic operating devices 10A and 10B are each configured to operate both a shifting device and a hydraulic brake device. However, it will be apparent from this disclosure that the bicycle hydraulic operating devices 10A and 10B can have only a single operating function (e.g., a braking function or a shifting function). In the illustrated embodiment, the right and left bicycle hydraulic operating devices 10A and 10B are essentially identical in operation, except that they are mirror images of each other and they may have a different number of shift operations. Thus, only the bicycle hydraulic operating device 10A will be discussed and illustrated herein.

Referring to FIGS. 2 to 9, the bicycle hydraulic operating device 10A comprises a base member 12. In the first embodiment, the base member 12 includes a first base part 16 and a second base part 18. Preferably, the second base part 18 is provided as a separate member with respect to the first base part 16. In the first embodiment, the second base part 18 is detachably coupled to the first base part 16. In other words, the first base part 16 is separable from the second base part 18 such that the first and second base parts 16 and 18 can be separated and reattached without damaging the first and second base parts 16 and 18. In particular, the first and second base parts 16 and 18 are detachably coupled by a plurality of fasteners 20 (e.g., screws). Here, the second base part 18 is directly in contact with the first base part 16.

With this configuration, the first base part 16 is constructed of a first material, and the second base part 18 is constructed of a second material that is different from the first material. Preferably, the first material of the first base part 16 is a metallic material. On the other hand, preferably, the second material of the second base part 18 is a resin material. For example, the first material of the first base part 16 can be aluminum, while the second material of the second base part 18 can be plastic or a reinforced plastic.

Figure 2:
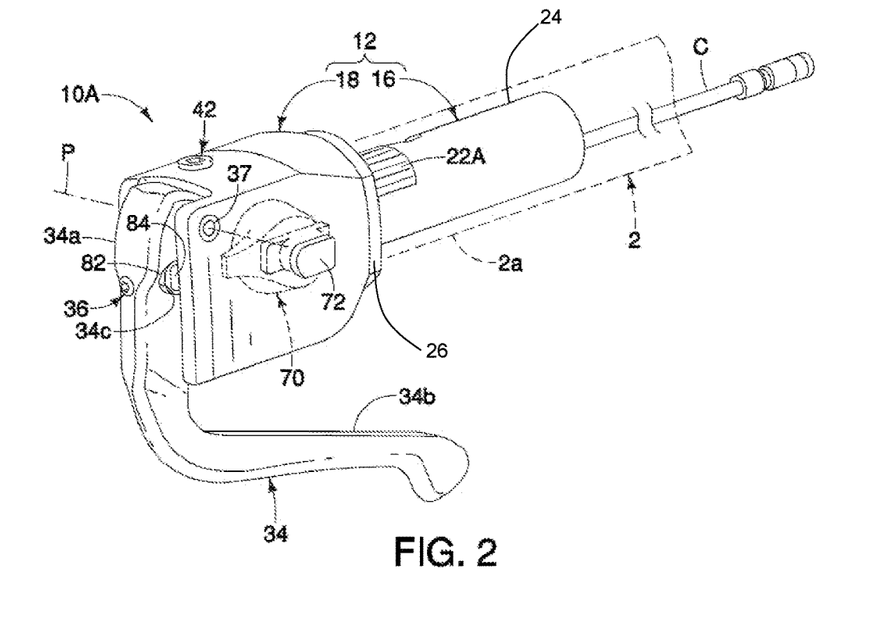
FIG. 2 is an inside perspective view of the right bicycle hydraulic operating device that is attached to the right free end of the handlebar illustrated in FIG. 1.
Figure 3:
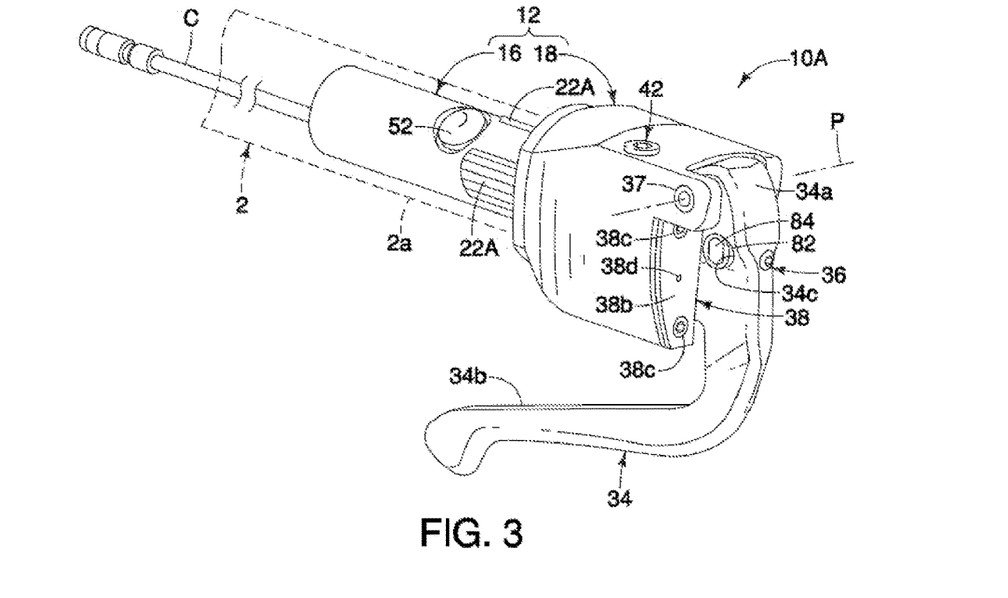
FIG. 3 is an outside perspective view of the right bicycle hydraulic operating device that is attached to the right free end of the handlebar illustrated in FIGS. 1 and 2.

As seen in FIGS. 2 and 3, the base member 12 is configured to be mounted on the handlebar 2. In the first embodiment, the bicycle hydraulic operating device 10A further comprises a handlebar fixing structure 22 that is provided on the first base part 16 of the base member 12. Here, the first base part 16 includes a bar portion 24 that has a cylindrical outer surface that is dimensioned to be inserted inside of an end 2a of the handlebar 2. In the first embodiment, the first base part 16 further includes a handlebar abutment 26 that is configured to contact an end 2a of the handlebar 2 when the bar portion 24 of the bicycle hydraulic operating device 10A is installed inside the handlebar 2. Here, the handlebar abutment 26 is an annular flange that extends perpendicularly from one end of the bar portion 24.

Referring to FIGS. 5 to 9, the handlebar abutment 26 is provided with a plurality of openings 26a (FIGS. 7 to 9) for receiving the fasteners 20 (FIGS. 5 and 6) therethrough. The fasteners 20 are received through the openings 26a of the first base part 16 and into a plurality of corresponding holes 62 (FIG. 7) of the second base part 18 to detachably couple the second base part 18 to the first base part 16. As seen in FIGS. 5, 6, 8 and 9, the handlebar abutment 26 is also provided with an opening 26b so that the handlebar fixing structure 22 can be inserted into the bar portion 24 and operated from the second base part 18. Thus, the handlebar fixing structure 22 is primarily disposed inside the bar portion 24. In this way, the handlebar fixing structure 22 is configured to be disposed inside the handlebar 2 when the bar portion 24 of the bicycle hydraulic operating device 10A is installed inside the handlebar 2.

Figure 8:
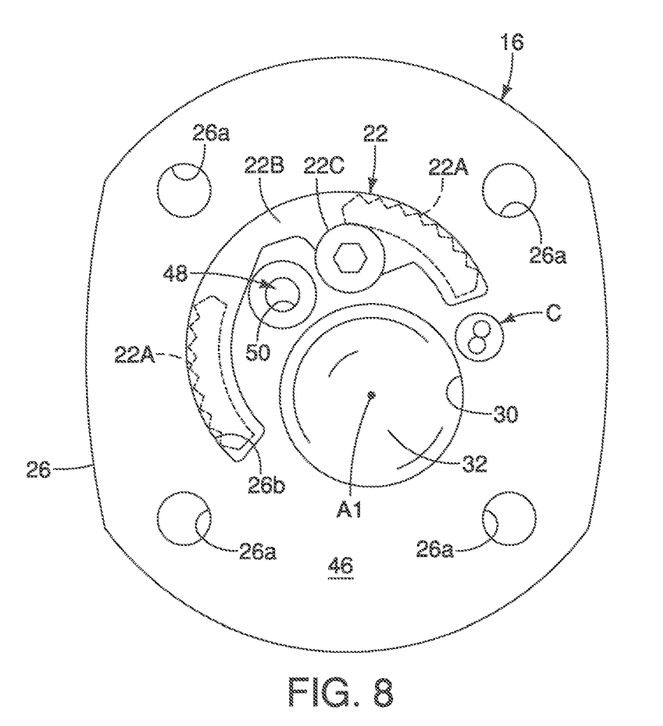
FIG. 8 is an enlarged, front elevational view of a first base part of the base member for the right bicycle hydraulic operating device illustrated in FIGS. 1 to 6.
Figure 9:
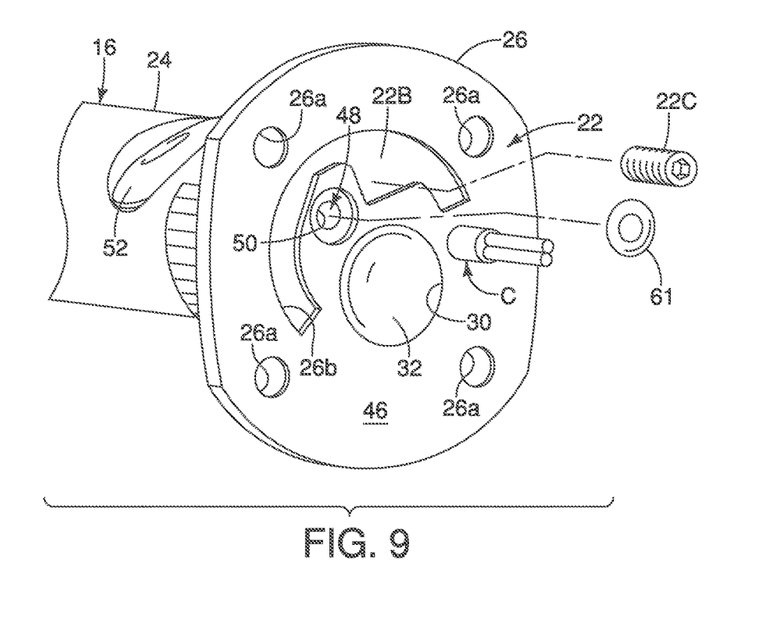
FIG. 9 is a partial perspective view of the first base part of the base member illustrated in FIG. 8 with selected parts exploded out from the first base part of the base member.
Figure 10:
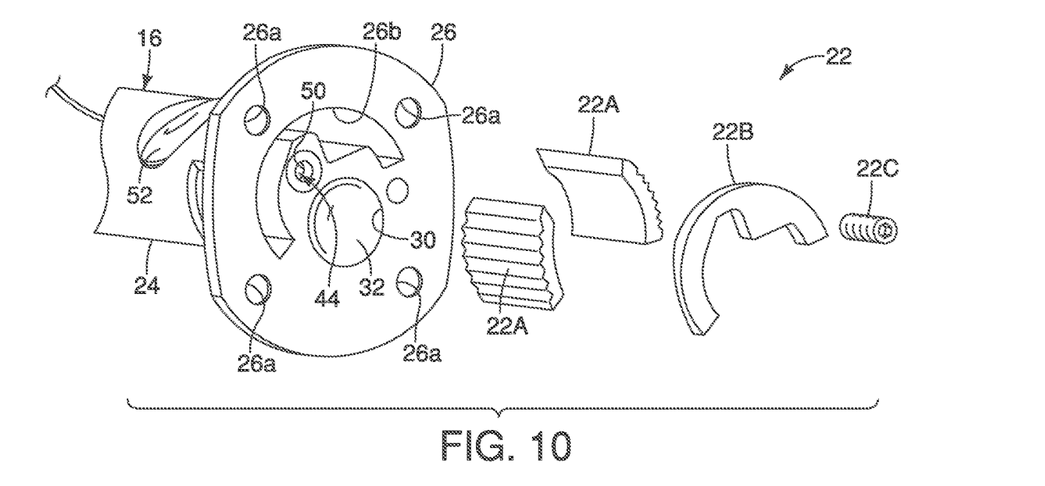
FIG. 10 is a partial perspective view, similar to FIG. 9, of the first base part of the base member illustrated in FIG. 8 with additional parts exploded out from the first base part of the base member.

In particular, as seen in FIGS. 8 to 10, the handlebar fixing structure 22 basically includes a pair of wedge blocks 22A, an expander body 22B and a pressure exerting member 22C. Basically, the handlebar fixing structure 22 is operatively connected to the base member 12 to vary the effective diameter of the bar portion 24. By varying the effective diameter of the bar portion 24, the bar portion 24 and the wedge blocks 22A engage an interior surface (i.e., an inner circumferential surface) of the handlebar 2. Thus, the handlebar fixing structure 22 secures the bar portion 24 inside the handlebar 2. Preferably, each of the wedge blocks 22A is an arc shaped member with a curved outer peripheral surface that has a plurality of grooves to provide a good gripping surface for engaging the interior surface of the handlebar 2 when the outer peripheral surfaces of the wedge blocks 22A are pressed against the interior surface of the handlebar 2 during installation of the bicycle hydraulic operating device 10A in the handlebar 2. Of course, if needed and/or desired, the outer peripheral surfaces of the wedge blocks 22A can be formed without such grooves.

In this first embodiment, the expander body 22B has a pair of inclined surfaces for engaging corresponding axial ends of the wedge blocks 22A. The pressure exerting member 22C is an adjustment screw that is threaded into a hole 64 (FIG. 7) of the second base part 18 with one end contacting the expander body 22B. As a result of screwing the pressure exerting member 22C into the second base part 18, the expander body 22B is pushed against the corresponding axial ends of the wedge blocks 22A to move the wedge blocks 22A radially outward through openings in the bar portion 24. In this way, the wedge blocks 22A vary the effective diameter of the bar portion 24 to secure the bar portion 24 inside the handlebar 2.

Figure 5:
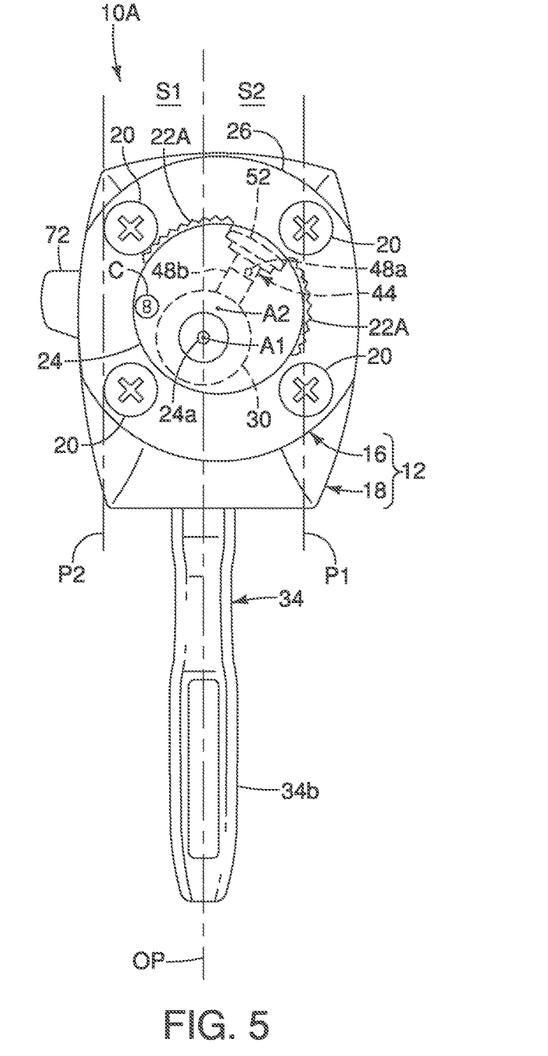
FIG. 5 is a rear elevational view of the right bicycle hydraulic operating device illustrated in FIGS. 1 to 4.
Figure 6:
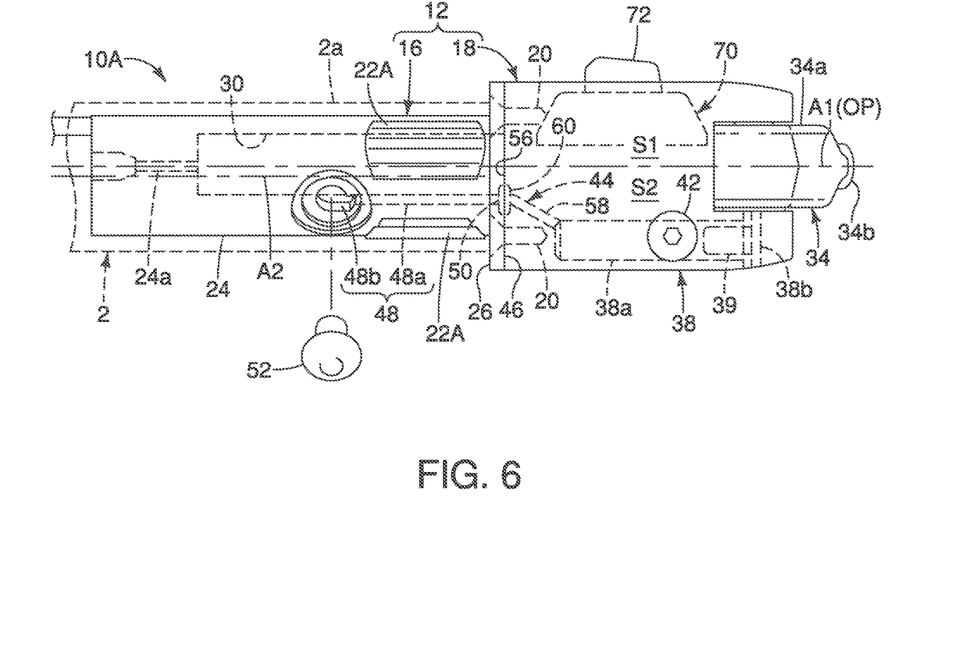
FIG. 6 is a top plan view of the right bicycle hydraulic operating device illustrated in FIGS. 1 to 5.

As seen in FIGS. 5 and 6, the base member 12 includes a cylinder bore 30. In particular, the cylinder bore 30 extends axially inside the bar portion 24 of the first base part 16 and opens through the handlebar abutment 26. Thus, the first base part 16 includes the cylinder bore 30, which is configured to be at least partly disposed inside the handlebar 2 when the bar portion 24 of the bicycle hydraulic operating device 10A is installed inside the handlebar 2. Here, the cylinder bore 30 has a cylinder axis A1 that is offset from a center longitudinal axis A2 of the base member 12. In the first embodiment the center longitudinal axis A2 is a center axis of the bar portion 24 having a cylindrical shape substantially. The cylinder axis A1 and the center longitudinal axis A2 can be coaxial if desired and/or needed. The end of the bar portion 24 is provided with an outlet port 24a that fluidly communicates with the cylinder bore 30. The outlet port 24a has an enlarged bore portion for attaching the hydraulic hose H thereto. For example, the enlarged bore portion of the outlet port 24a can be threaded for attaching the hydraulic hose H thereto.

Figure 14:
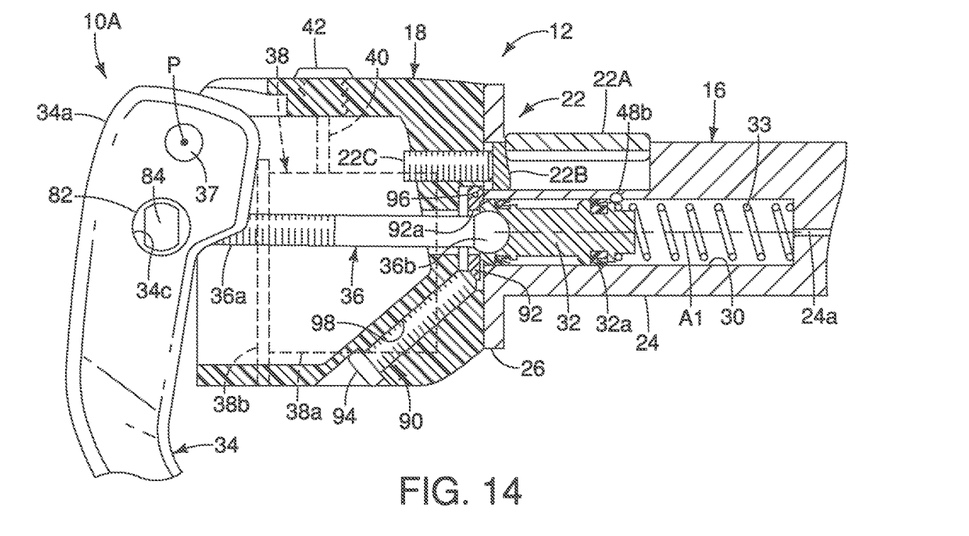
FIG. 14 is a center longitudinal cross section of the right bicycle hydraulic operating device showing a second position adjustment structure for adjusting a rest position of a piston of the right bicycle hydraulic operating device illustrated in FIGS. 1 to 6.
Figure 15:
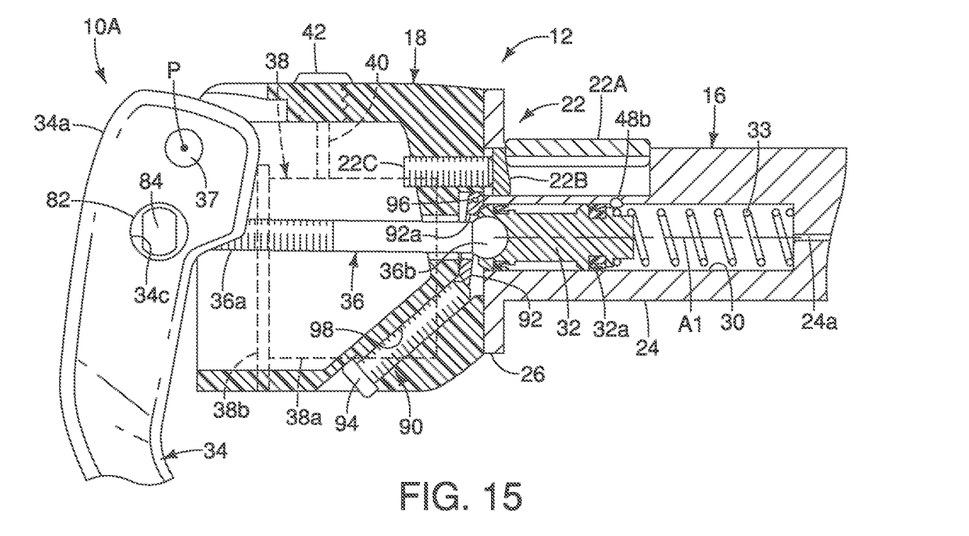
FIG. 15 is a center longitudinal cross section, similar to FIG. 14, of the right bicycle hydraulic operating device but with the piston in a different rest position as a result of the second position adjustment structure having been adjusted.

As seen in FIGS. 14 and 15, the bicycle hydraulic operating device 10A further comprises a piston 32. The piston 32 is movably disposed in the cylinder bore 30 of the first base part 16. A biasing member 33 is also disposed inside the cylinder bore 30 of the first base part 16. Here, the biasing member 33 is a compression spring that biases the piston 32 away from the outlet port 24a towards a rest position. When the bicycle hydraulic operating device 10A is operated by a user, the piston 32 moves inside the cylinder bore 30 towards the outlet port 24a to force hydraulic fluid out from the cylinder bore 30 through the outlet port 24a to the brake device (not shown) via the hydraulic hose H.

In the first embodiment, the bicycle hydraulic operating device 10A further comprises an operating member 34. The operating member 34 is configured as an operating lever. The operating member 34 is movably mounted on the second base part 18 and operatively coupled to the piston 32 to move the piston 32 inside the cylinder bore 30. In particular, in the first embodiment, the bicycle hydraulic operating device 10A comprises a connecting rod 36. The connecting rod 36 operatively couples the operating member 34 to the piston 32 as seen in FIGS. 14 and 15. In this way, the piston 32 is movably disposed in the cylinder bore 30 of the base member 12 along the cylinder axis A1 of the cylinder bore 30 as the operating member 34 is moved from a rest position to an actuated position. In other words, the operating member 34 is operatively coupled to the piston 32 to move the piston 32 in the cylinder bore 30 in response to actuation of the operating member 34 from the rest position to the actuated position.

Here, as seen in FIGS. 2 and 3, the operating member 34 includes a base portion 34a and a user operating portion 34b. The user operating portion 34b extends from the base portion 34a. In this way, the bicycle hydraulic operating device 10A comprises an operating lever (the operating member 34). Thus, the operating member 34 is an operating lever in which the base portion 34a is pivotally mounted to the second base part 18 about a pivot axis P defined by a pivot pin 37. In other words, the operating lever (the operating member 34) is pivotally mounted to the base member 12 via the pivot pin 37 to pivot about the pivot axis P. Thus, the operating member 34 moves along an operating plane OP that includes the cylinder axis A1 of the cylinder bore 30.

Figure 4:
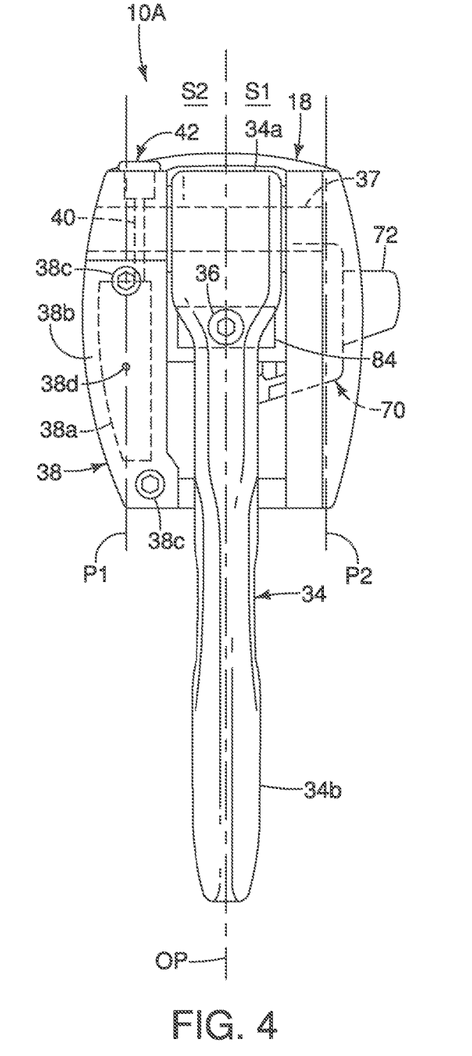
FIG. 4 is a front elevational view of the right bicycle hydraulic operating device illustrated in FIGS. 1 to 3.

As seen in FIGS. 3, 4 and 6, the base member 12 includes a reservoir tank 38. In particular, in the first embodiment, the second base part 18 includes the reservoir tank 38, which is configured to be at least partly disposed outside the handlebar 2. More preferably, as in the first embodiment, the reservoir tank 38 is entirely disposed outside the handlebar 2. Basically, the reservoir tank 38 is integrated into the second base part 18. Here, the reservoir tank 38 has a reservoir 38a and a cover 38b. The reservoir 38a is defined by the second base part 18, while the cover 38b is removably attached to the second base part 18 by a plurality of fasteners 38c (i.e., screws) to close off the reservoir 38a. In the first embodiment, the reservoir 38a of the reservoir tank 38 is provided on the base member 12 as unitary member with the second base part 18. However, alternatively, it will be apparent from this disclosure that the reservoir tank 38 can be a separate part that is attached to the second base part 18. In particular, alternatively, the reservoir 38a of the reservoir tank 38 can be a separate part that is attached to the base member 12.

As seen FIGS. 4 and 5, the base member 12 has a first side S1 and a second side S2 with respect to the operating plane OP of the operating member 34. In other words, the operating plane OP of the operating member 34 defines a first portion of the second base part 18 located on the first side S1 of the base member 12, and a second portion of the second base part 18 located on the second side S2 of the base member 12.

As seen in FIG. 6, preferably, the reservoir tank 38 is provided with a diaphragm 39. When the diaphragm 39 is provided inside the reservoir 38a, the cover 38b is provided with air vent 38d as seen in FIG. 4. Also as seen in FIG. 4, the base member 12 includes a bleed port 40 that is fluidly connected to the reservoir tank 38. In the first embodiment, as seen in FIG. 4, the second base part 18 includes the bleed port 40 that is fluidly connected to the reservoir tank 38. A bleed screw 42 is screwed into the bleed port 40 for closing off the bleed port 40. The bleed screw 42 is loosened for bleeding air out of the reservoir tank 38.

As seen in FIGS. 14 and 15, in one preferred arrangement, the reservoir tank 38 is arranged to overlap the connecting rod 36 as viewed in a direction parallel to the pivot axis P of the operating member 34 (i.e., the operating lever). Also as seen in FIG. 6, the reservoir tank 38 is arranged to at least partly offset from the cylinder bore 30 in a direction parallel to the cylinder axis A1.

As seen in FIG. 6, the base member 12 includes a fluid passageway 44 that extends between the reservoir tank 38 and the cylinder bore 30. The fluid passageway 44 includes at least a portion that extends parallel along the cylinder bore 30. In particular, as seen in FIGS. 6 and 9, the first base part 16 includes a first end surface 46 and a first passage 48. The first passage 48 forms a part of the fluid passageway 44 extending between the reservoir tank 38 and the cylinder bore 30. The first end surface 46 has a first opening 50. The first passage 48 extends from the first opening 50 in the first end surface 46 to the cylinder bore 30. In the first embodiment, as seen in FIG. 6, the first passage 48 includes a first portion 48a that extends parallel to the cylinder axis A1 of the cylinder bore 30 from the first opening 50 in the first end surface 46. As seen in FIGS. 5 and 6, the first passage 48 includes a second portion 48b that extends non-parallel to fluidly connecting the first portion 48a to the cylinder bore 30. A plug 52 is detachably attached to an outward port of the second portion 48b of the first passage 48.

Figure 7:
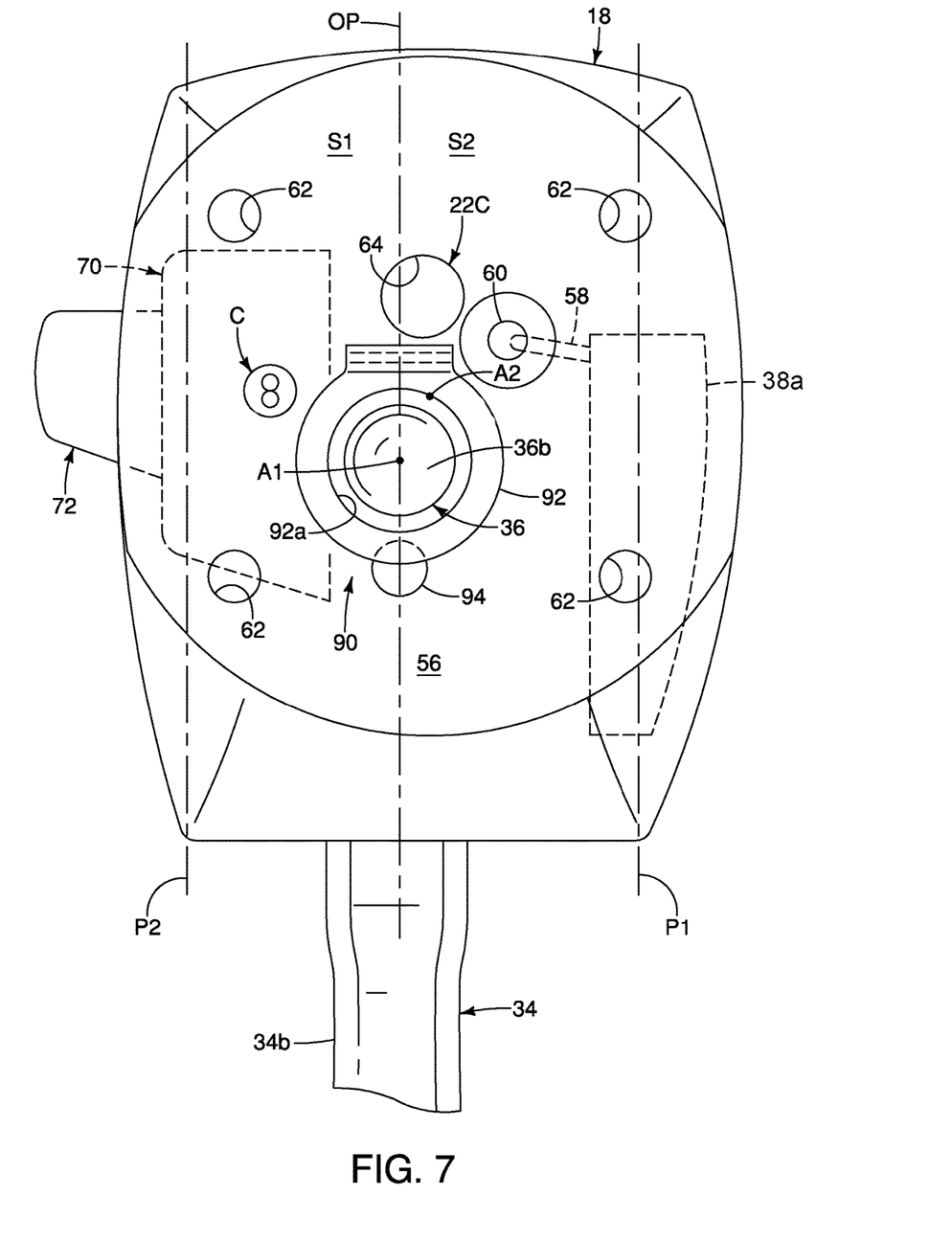
FIG. 7 is an enlarged, rear elevational view of a second base part of a base member for the right bicycle hydraulic operating device illustrated in FIGS. 1 to 6.

As seen in FIGS. 6 and 7, the second base part 18 includes a second end surface 56 and a second passage 58. The second end surface 56 has a second opening 60. The second passage 58 extends from the second opening 60 in the second end surface 56 to the reservoir tank 38. The first end surface 46 faces the second end surface 56. The first and second passages 48 and 58 are fluidly connected via the first and second openings 50 and 60. Preferably, a washer 61 (FIG. 9) is disposed between the first and second openings 50 and 60 to seal the interface between the first and second end surfaces 46 and 56

Figure 11:
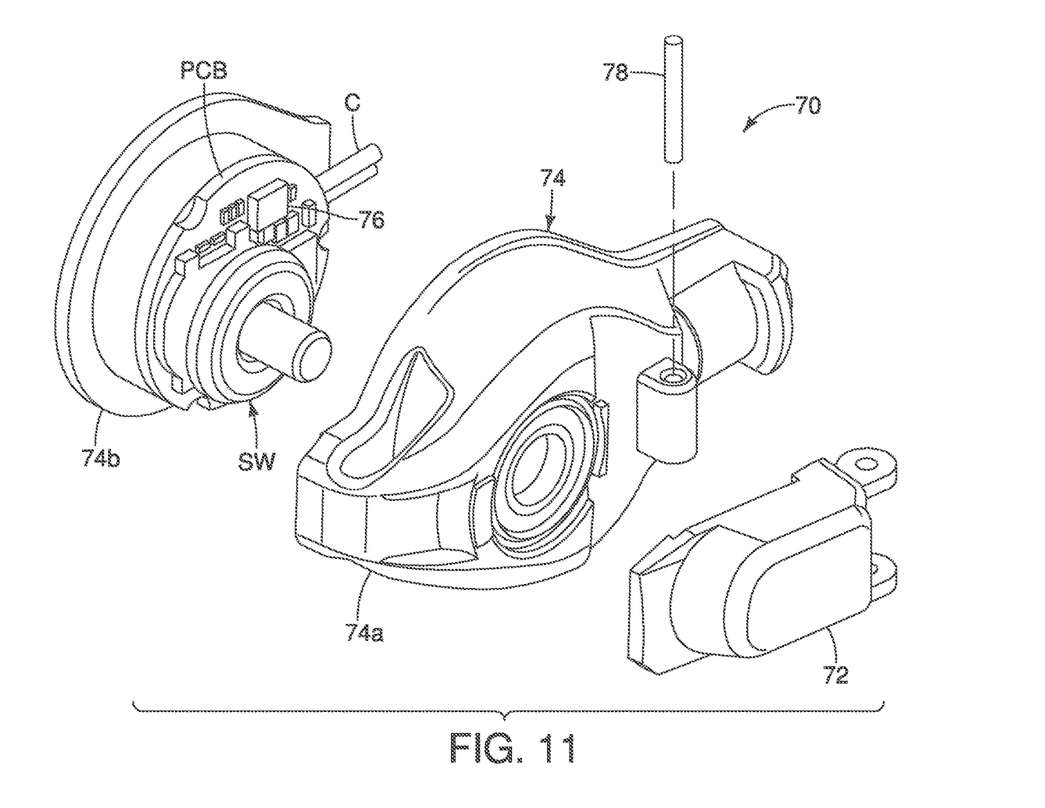
FIG. 11 is a perspective view of an operating unit of the right bicycle hydraulic operating device illustrated in FIGS. 1 to 6.
Figure 12:
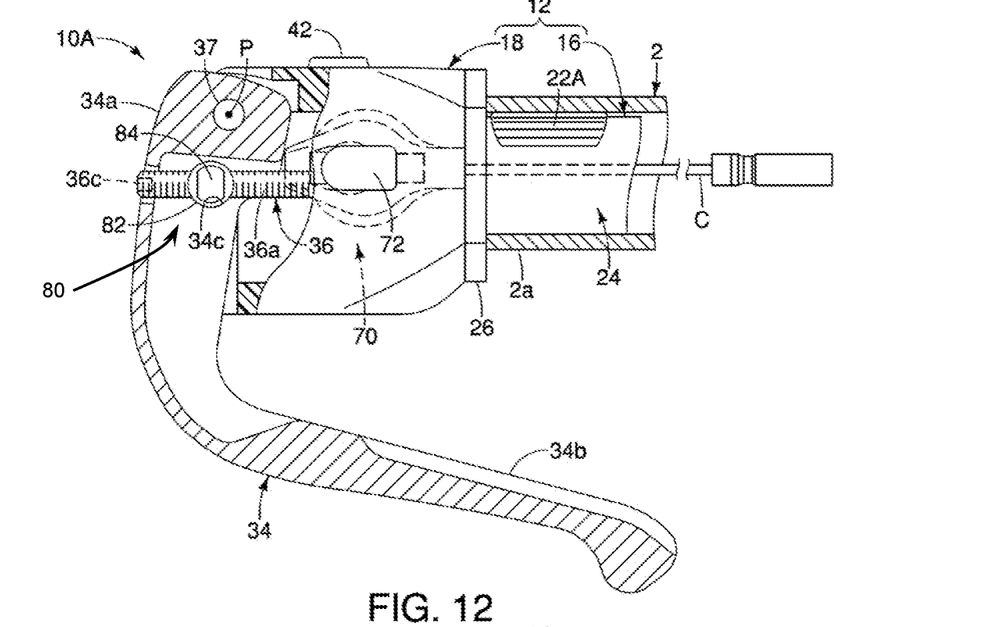
FIG. 12 is an inside elevational view of the right bicycle hydraulic operating device with a portion of the second base part broken away to show a first position adjustment structure for adjusting a rest position of an operating member of the right bicycle hydraulic operating device illustrated in FIGS. 1 to 6.
Figure 13:
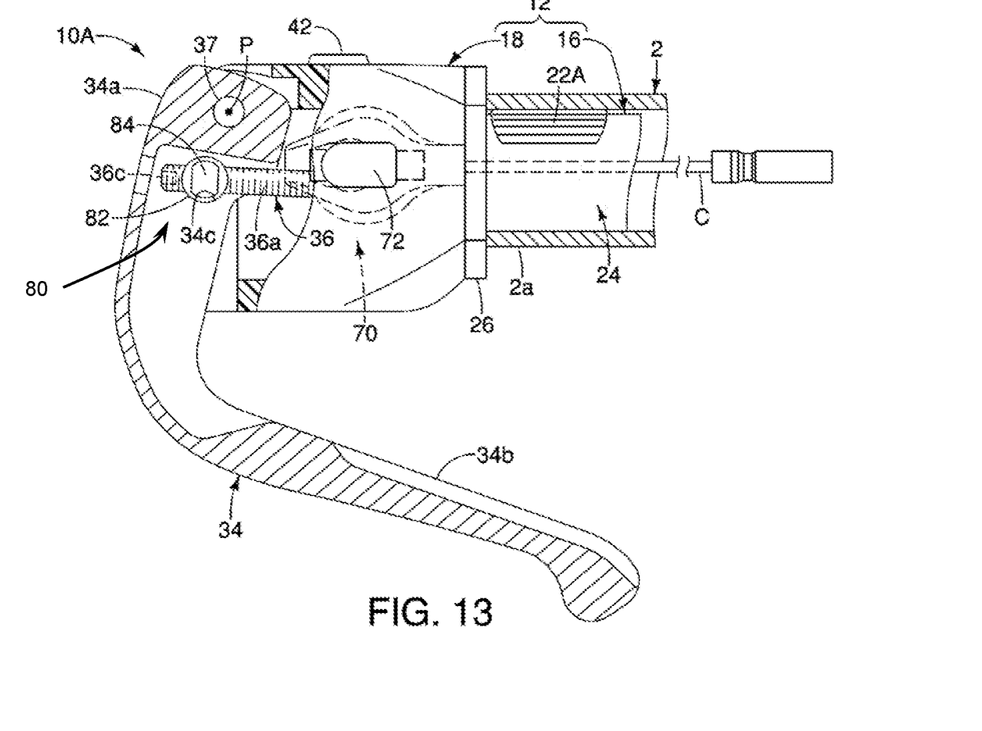
FIG. 13 is an inside elevational view, similar to FIG. 12, of the right bicycle hydraulic operating device with the portion of the second base part broken away but showing the operating member in a different rest position as a result of the first position adjustment structure having been adjusted.

Referring to FIGS. 11 to 13, the bicycle hydraulic operating device 10A further comprises an operating unit 70 that is disposed on at least one of the first base part 16 and the second base part 18. Here, in the first embodiment, the operating unit 70 is disposed on the second base part 18. The operating unit 70 is preferably an electrical operating unit. Thus, the operating unit 70 includes an electric switch SW. The operating unit 70 further includes a user interface member 72 configured to operate the electric switch SW. The operating unit 70 further includes a housing 74 that supports the electric switch SW and the user interface member 72 on the second base part 18. The operating unit 70 further includes a printed circuit board PCB disposed in the housing 74. The electric cable C is electrically connected to the printed circuit board PCB for transmitting electrical signals. The electrical signals are preferably transmitted using powerline communications (PLC).

In particular, as seen in FIG. 11, the housing 74 has a first housing part 74a and a second housing part 74b that are secured together for housing the electric switch SW and the printed circuit board PCB. The electric switch SW is electrically coupled to the printed circuit board PCB, and is preferably a push type contact switch. Preferably, the printed circuit board PCB includes a microcomputer 76 that includes a processor, a storage device (memory) and other conventional components. The user interface member 72 is pivotally mounted to the first housing part 74a by a pivot pin 78. The user interface member 72 overlies a plunger of the electric switch SW such that the electric switch SW is activated when the user interface member 72 is pivoted on the pivot pin 78. Preferably, the user interface member 72 includes a button portion that projects from the inside surface of the second base part 18.

As seen in FIGS. 6 and 7, the operating unit 70 is disposed on the first side S1 of the base member 12. The reservoir tank 38 is disposed on the second side S2 of the base member 12. The first and second sides S1 and S2 of the base member 12 face in opposite directions away from the center longitudinal axis A2 of the base member 12. Here, the first and second sides S1 and S2 are defined by the operating plane OP which includes the cylinder axis A1. As mentioned above, the operating member 34 moves along the operating plane OP as the operating member 34 is pivoted from a rest position to an actuated position. As seen in FIGS. 6 and 7, the electric switch SW is arranged between the reservoir tank 38 and the user interface member 72.

Referring back to FIGS. 4, 5 and 7, the reservoir tank 38 is disposed on the second base part 18 of the base member 12 along a first plane P1 that is parallel to the cylinder axis A1 of the cylinder bore 30. On the other hand, the operating unit 70 is disposed on the second base part 18 of the base member 12 along a second plane P2 that is parallel to the cylinder axis A1 of the cylinder bore 30. Furthermore, the operating member 34 is disposed between the first and second planes P1 and P2 without intersecting the first and second planes P1 and P2. The first and second planes P1 and P2 are arranged such that the center longitudinal axis A2 of the base member 12 extends therebetween. In the first embodiment, the first and second planes P1 and P2 are parallel with respect to one another. In particular, in the first embodiment, the first and second planes P1 and P2 are parallel to the operating plane OP of the operating member 34. While the first and second planes P1 and P2 are illustrated at different distances from the operating plane OP, the locations of the first and second planes P1 and P2 are not limited to the illustrated locations and orientations. For example, the first and second planes can be angled within 60 degrees if desired and/or needed.

Referring to FIGS. 12 and 13, the bicycle hydraulic operating device 10A further comprises a first position adjustment structure 80 that is configured to adjust a rest position of the operating member 34 with respect to the second base part 18 of the base member 12. The first position adjustment structure 80 includes a rotating shaft (i.e., the connecting rod 36) adjustably connecting the operating member 34 to the piston 32 to adjust the rest position of the operating member 34 with respect to the second base part 18 of the base member 12. More specifically, the first position adjustment structure 80 further includes a pivot pin 82 (i.e., a trunnion) and a nut 84. The pivot pin 82 is pivotally supported in a pair of aligned holes 34c of the operating member 34. The nut 84 is non-rotatably disposed inside the pivot pin 82. The connecting rod 36 (i.e., the rotating shaft) has a threaded portion 36a that is threaded into the nut 84, and a ball portion 36b (FIGS. 14 and 15) that is at the opposite end from the threaded portion 36a. A tool engagement structure 36c is provided on the end surface of the connecting rod 36 adjacent the threaded portion 36a. Here, the tool engagement structure 36c is a blind bore with a hexagonally cross section (i.e., a hexagonal socket) that receives a hex key. Thus, using a hex key the connecting rod 36 (i.e., the rotating shaft) is rotated causing the nut 84 to move axially along the threaded portion 36a of the connecting rod 36. In this way, the rest position of the operating member 34 can be adjusted with respect to the second base part 18 of the base member 12.

Referring to FIGS. 14 and 15, the bicycle hydraulic operating device 10A further comprises a second position adjustment structure 90 that is configured to adjust a rest position of the piston 32 in the cylinder bore 30. The second position adjustment structure 90 is sometimes called a dead-band adjustment mechanism. The second position adjustment structure 90 is similar to the dead-band adjustment mechanism that is disclosed in U.S. Pat. No. 7,540,147, which is assigned to Shimano Inc. In particular, the second position adjustment structure 90 includes a seat 92 and an adjustment screw 94. The seat 92 is provided on the base member 12 to receive the piston 32. The adjustment screw 94 is screwed into the base member 12 to move the seat 92. In the first embodiment, the seat 92 is pivotally mounted to the second base part 18 of the base member 12 by a pivot pin 96. The seat 92 has an opening 92a for receiving the connecting rod 36 therethrough. The opening 92a is sized slightly larger than the ball portion 36b of the connecting rod 36. In this way, the seat 92 does not interfere with the movement of the connecting rod 36 during operation of the operating member 34. Here, the adjustment screw 94 is provided on the second base part 18 of the base member 12. In particular, in the first embodiment, the adjustment screw 94 is threaded into a bore 98 of the second base part 18 of the base member 12. It will be understood from FIGS. 14 and 15, the movement of the adjustment screw 94 causes the seat 92 pivot between a first position (FIG. 14) and the second position (FIG. 15). In the first embodiment, the adjustment screw 94 has a first end that includes a tool engagement structure for turning the adjustment screw 94, and has a second end configured to engage the seat 92.

It will be appreciated by those skilled in the bicycle field that the seat 92 and adjustment screw 94 are used for adjusting or selecting the rest position of the piston 32. In this way, a rest position of a sealing member 32a of the piston 32 is adjusted with respect to a port of the second portion 48b of the first passage 48. The sealing member 32a is arranged to block the second portion 48b from fluid communication with the hydraulic chamber defined by the cylinder bore 30 and the piston 32 during an actuation stroke of the piston 32. As known in the bicycle field, the distance between the sealing member 32a and the port of the second portion 48b is referred to as the dead band.

Figure 16:
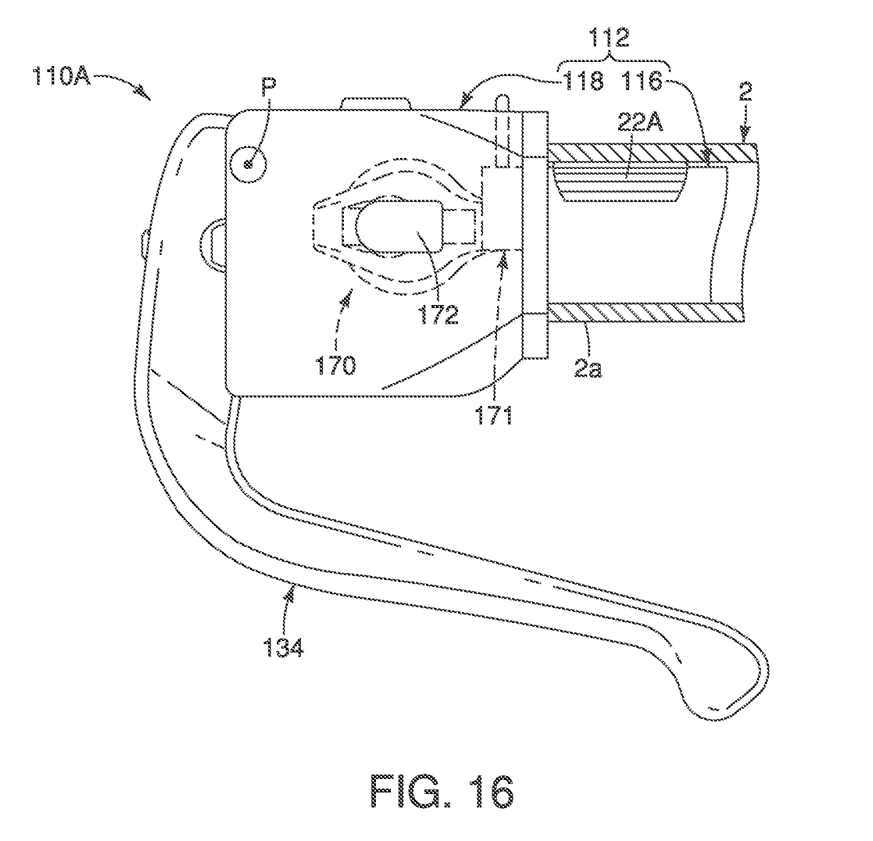
FIG. 16 is an inside elevational view of a right bicycle hydraulic operating device in accordance with a second embodiment.

Referring now to FIG. 16, a right bicycle hydraulic operating device 110A is illustrated in accordance with a second embodiment. In the second embodiment, the bicycle hydraulic operating device 110A basically comprises a base member 112 having a first base part 116 and a second base part 118. The base member 112 is identical to the base member 12 of the first embodiment. In other words, the first and second base parts 116 and 118 are identical to the first and second base parts 16 and 18. Here, the bicycle hydraulic operating device 110A is identical to the bicycle hydraulic operating device 10A, as discussed above, except that the bicycle hydraulic operating device 110A has been configured to wirelessly communicate control signals instead of transmitting the control signals via the electric cable C.

Thus, the first base part 116 is mounted inside the handlebar 2 by the handlebar fixing structure of the first embodiment, and defines a cylinder bore with a piston and a spring disposed inside the cylinder bore in the same configuration as the first embodiment. The rest position of the piston inside the first base part 116 is adjustably in the same manner as the first embodiment. The cylinder bore of the first base part 116 is fluidly connected to a reservoir of the second base part 118 in the same manner as the first embodiment. Also an operating member 134 is pivotally mounted to the second base part 118 in the same manner as the first embodiment. The rest position of the operating member 134 is adjustably in the same manner as the first embodiment.

Furthermore, the bicycle hydraulic operating device 110A further comprises an electrical operating unit 170 that is identical to the operating unit 70, as discussed above, except that the bicycle hydraulic operating device 110A further comprises a wireless communication unit 171 that is electrically coupled to the electric switch SW of the operating unit 170. More specifically, the wireless communication unit 171 is electrically connected to the electric switch SW via a printed circuit board having a microcomputer as shown in FIG. 11. In this way, the wireless communication unit 171 receives signals from the microcomputer in response to operation of the electric switch SW using a user interface member 172, which is mounted to the operating unit 170 in the same manner that the user interface member 72 is mounted to the operating unit 70, as discussed above.

Since the addition of the wireless communication unit 171 in the bicycle hydraulic operating device 110A is the only difference between the first and second embodiments, further descriptions of the parts of the second embodiment that are identical to the parts of the first embodiment have been omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hydraulic operating device. Accordingly, these directional terms, as utilized to describe the bicycle hydraulic operating device should be interpreted relative to a bicycle in an upright riding position on a horizontal surface and that is equipped with the bicycle hydraulic operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic operating device comprising:
   a first base part including a cylinder bore, a first end surface having a first opening, and a first passage extending from the first opening in the first end surface to the cylinder bore;
   a second base part including a reservoir tank, a second end surface having a second opening, and a second passage extending from the second opening in the second end surface to the reservoir tank, the first and second base parts being connected to each other at the first and second end surfaces substantially along a single plane, the first and second passages being fluidly connected via the first and second openings;
   a piston movably disposed in the cylinder bore of the first base part; and
   an operating member movably mounted on the second base part and operatively coupled to the piston to move the piston.

2. The bicycle hydraulic operating device according to claim 1, wherein
   the first base part is constructed of a first material, and the second base part is constructed of a second material that is different from the first material.

3. The bicycle hydraulic operating device according to claim 2, wherein
   the first material of the first base part is a metallic material.

4. The bicycle hydraulic operating device according to claim 3, wherein
   the second material of the second base part is a resin material.

5. The bicycle hydraulic operating device according to claim 1, further comprising
   a handlebar fixing structure provided on the first base part.

6. The bicycle hydraulic operating device according to claim 5, wherein
   the handlebar fixing structure is configured to be disposed inside a handlebar.

7. The bicycle hydraulic operating device according to claim 1, wherein
   the operating member is pivotally mounted to the second base part about a pivot axis.

8. The bicycle hydraulic operating device according to claim 1, wherein
   the first passage includes a first portion extending parallel to a cylinder axis of the cylinder bore from the first opening in the first end surface.

9. The bicycle hydraulic operating device according to claim 8, wherein
   the first passage includes a second portion extending non-parallel to fluidly connecting the first portion to the cylinder bore.

10. The bicycle hydraulic operating device according to claim 1, wherein
    the first base part further includes a handlebar abutment that is configured to contact an end of a handlebar.

11. The bicycle hydraulic operating device according to claim 1, further comprising
    an operating unit disposed on at least one of the first base part and the second base part.

12. The bicycle hydraulic operating device according to claim 11, wherein
    the operating unit includes an electric switch.

13. The bicycle hydraulic operating device according to claim 12, wherein
    the operating unit further includes a user interface member configured to operate the electric switch,
    the electric switch is arranged between the reservoir tank and the user interface member.

14. The bicycle hydraulic operating device according to claim 12, further comprising
    a wireless communication unit electrically coupled to the electric switch of the operating unit.

15. The bicycle hydraulic operating device according to claim 1, wherein
    the second base part is provided as a separate member with respect to the first base part.

16. The bicycle hydraulic operating device according to claim 15, wherein
    the second base part is detachably coupled to the first base part.

17. A bicycle hydraulic operating device comprising:
    a first base part including a cylinder bore, a first end surface having a first opening, and a first passage extending from the first opening in the first end surface to the cylinder bore;
    a second base part including a reservoir tank, a second end surface having a second opening, and a second passage extending from the second opening in the second end surface to the reservoir tank, the first and second base parts being connected to each other at the first and second end surfaces, the first and second passages being fluidly connected via the first and second openings;
    a piston movably disposed in the cylinder bore of the first base part,
    an operating member movably mounted on the second base part and operatively coupled to the piston to move the piston; and a first position adjustment structure configured to adjust a rest position of the operating member with respect to the second base part.

18. The bicycle hydraulic operating device according to claim 17, wherein
the first position adjustment structure includes a rotating shaft adjustably connecting the operating member to the piston to adjust the rest position of the operating member with respect to the second base part.

19. The bicycle hydraulic operating device according to claim 18, further comprising
a second position adjustment structure configured to adjust a rest position of the piston in the cylinder bore.

20. The bicycle hydraulic operating device according to claim 19, wherein
the second position adjustment structure includes a seat provided on the second base part to receive the piston, and an adjustment screw screwed into the second base part to move the seat.

21. The bicycle hydraulic operating device according to claim 20, wherein
the adjustment screw is provided on the second base part.

22. A bicycle hydraulic operating device comprising:
a first base part including a cylinder bore, a first end surface having a first opening, and a first passage extending from the first opening in the first end surface to the cylinder bore;
a second base part including a reservoir tank, a second end surface having a second opening, and a second passage extending from the second opening in the second end surface to the reservoir tank, the first and second base parts being connected to each other at the first and second end surfaces substantially along a single plane, the first and second passages being fluidly connected via the first and second openings, the second base part including a bleed port fluidly connected to the reservoir tank; and
a piston movably disposed in the cylinder bore of the first base part.

* * * * *